Aug. 22, 1967   G. E. MARTIN ETAL   3,337,697
ENCLOSED TROLLEY BUSWAY SYSTEM
Filed June 30, 1964   9 Sheets-Sheet 3
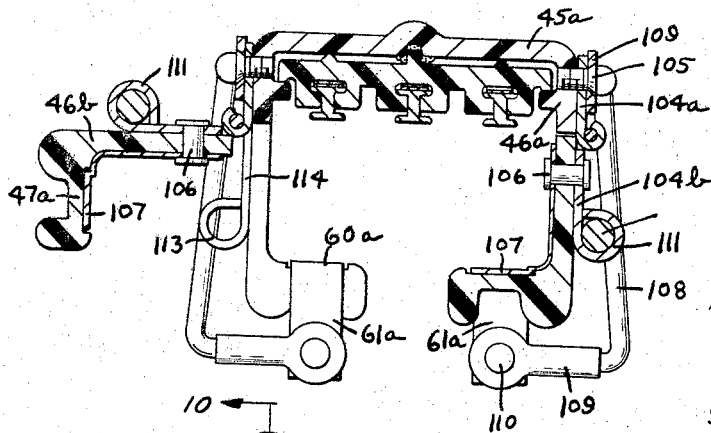
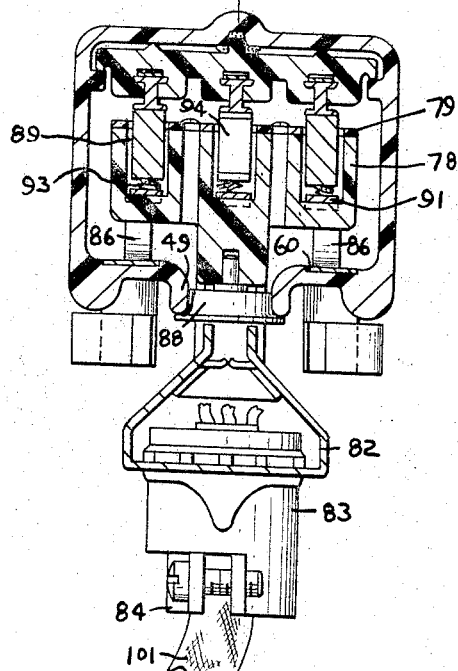
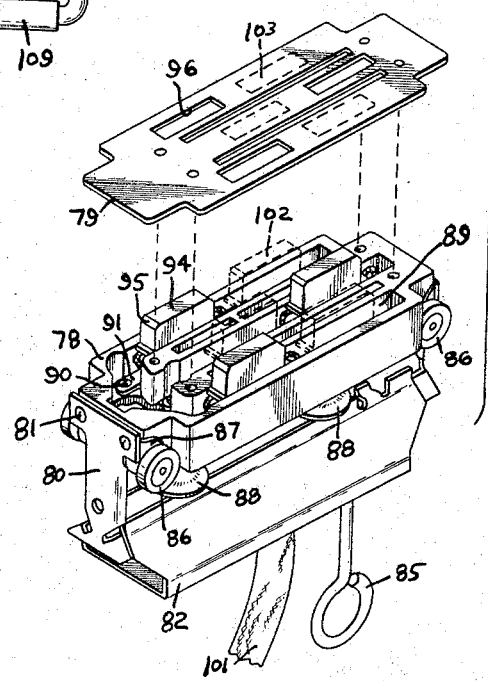
INVENTOR.
DONALD G. SPRIGINGS
BY GERALD E. MARTIN
ATTORNEY Aug. 22, 1967   G. E. MARTIN ETAL   3,337,697
ENCLOSED TROLLEY BUSWAY SYSTEM
Filed June 30, 1964   9 Sheets-Sheet 4

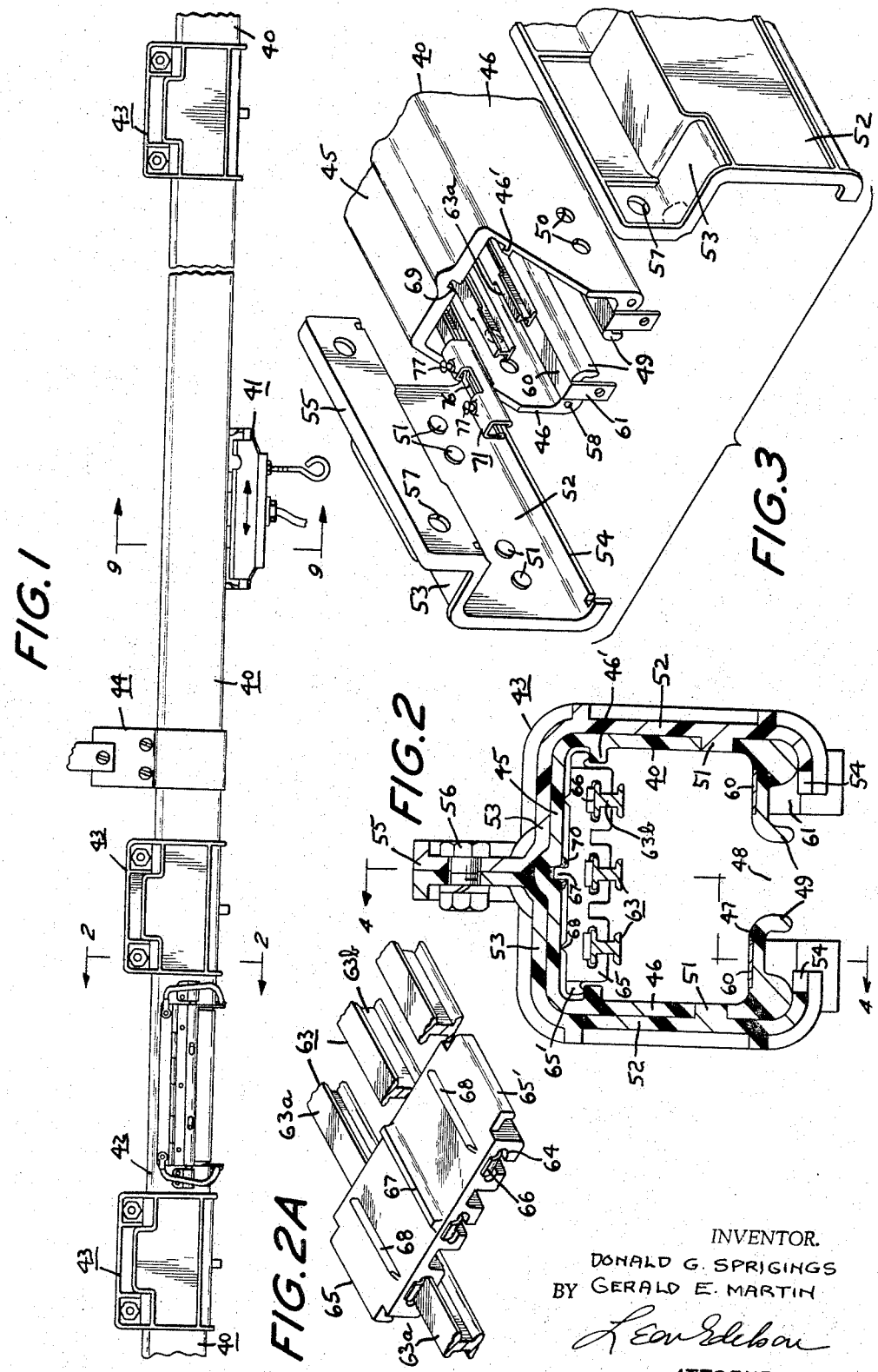

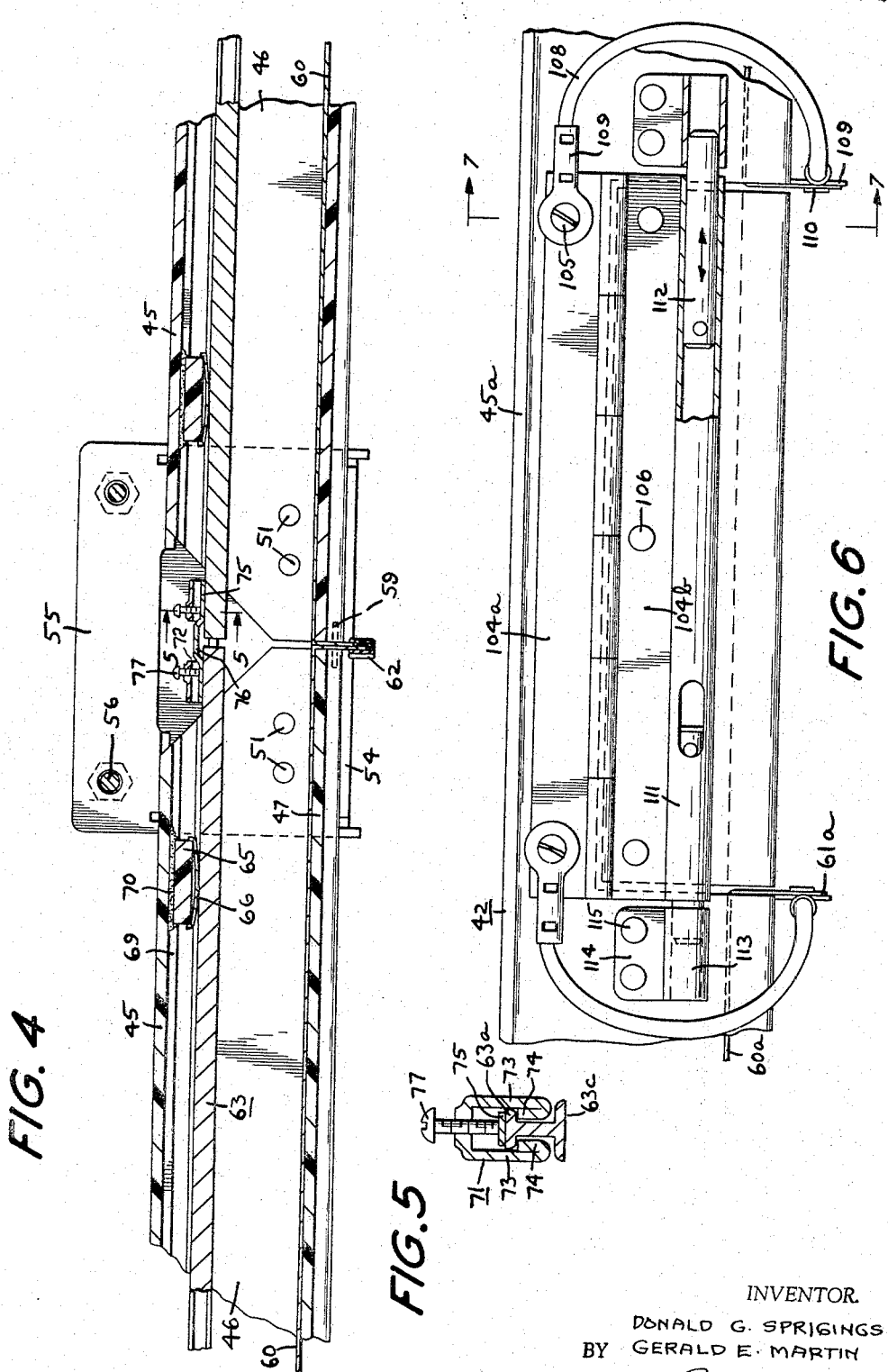

INVENTOR.
DONALD G. SPRIGINGS
BY GERALD E. MARTIN

*Leo Edelson*

ATTORNEY

Aug. 22, 1967   G. E. MARTIN ETAL   3,337,697
ENCLOSED TROLLEY BUSWAY SYSTEM
Filed June 30, 1964   9 Sheets-Sheet 5
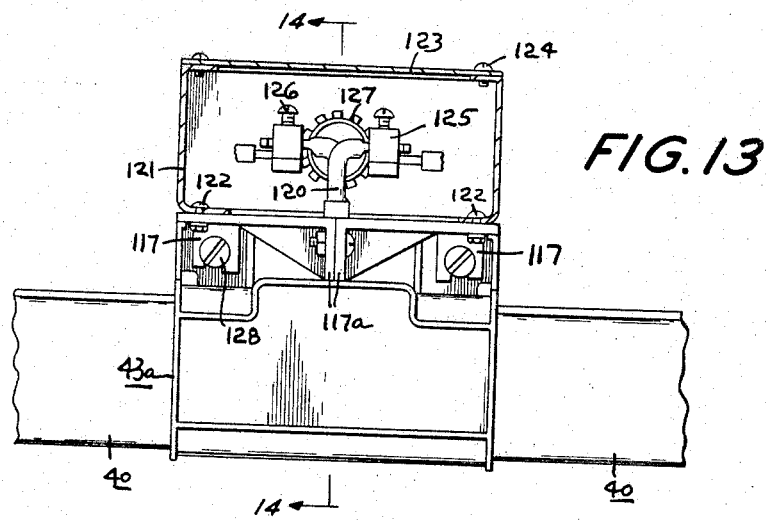
FIG.13
FIG.14
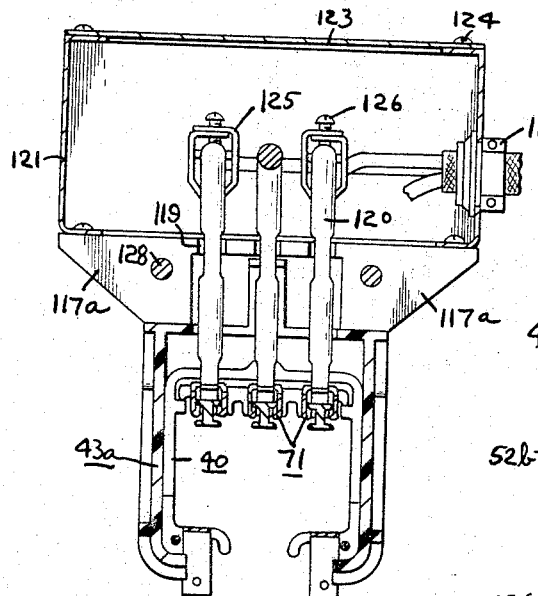
FIG.16
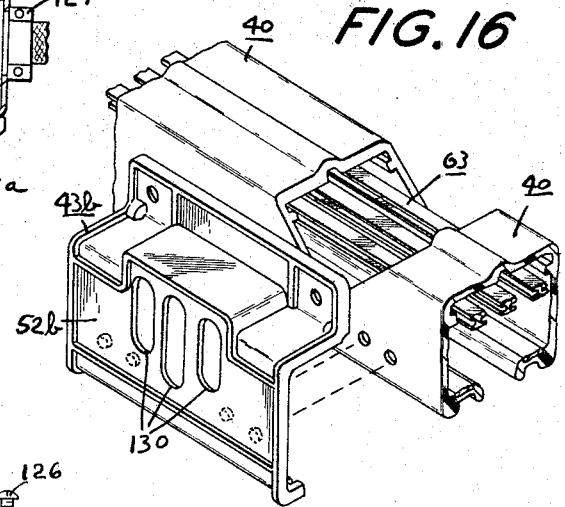
FIG.15
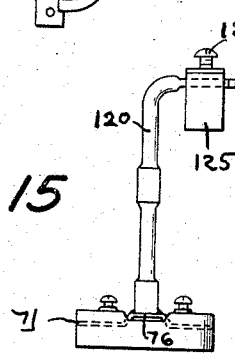
INVENTOR.
DONALD G. SPRIGINGS
BY GERALD E. MARTIN
*Leon Edelson*
ATTORNEY Aug. 22, 1967 G. E. MARTIN ETAL 3,337,697
ENCLOSED TROLLEY BUSWAY SYSTEM
Filed June 30, 1964 9 Sheets-Sheet 6
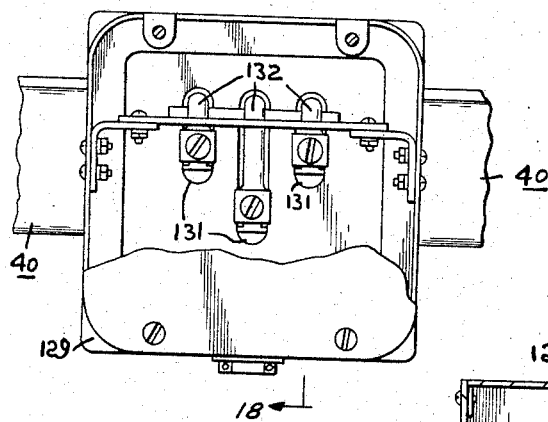
FIG.17
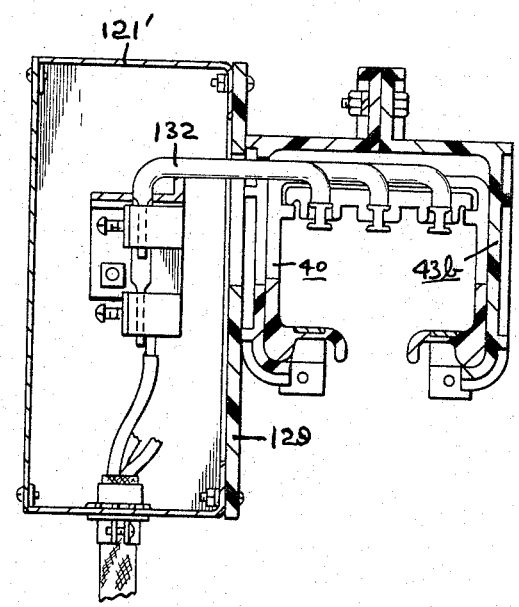
FIG.18
FIG.19
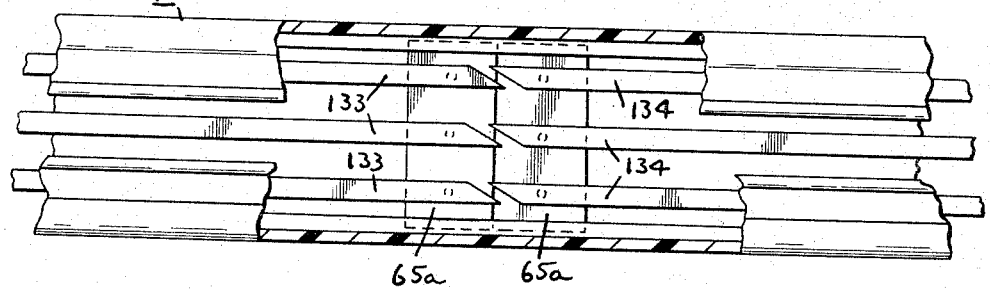
INVENTOR.
DONALD G. SPRIGINGS
BY GERALD E. MARTIN
*Leo Edelson*
ATTORNEY

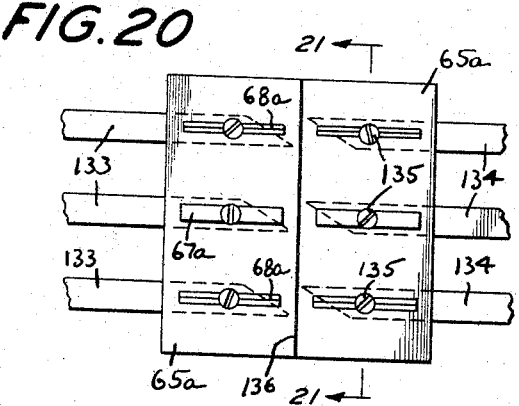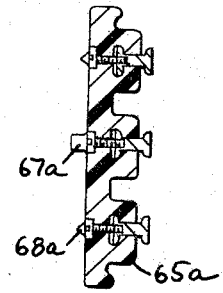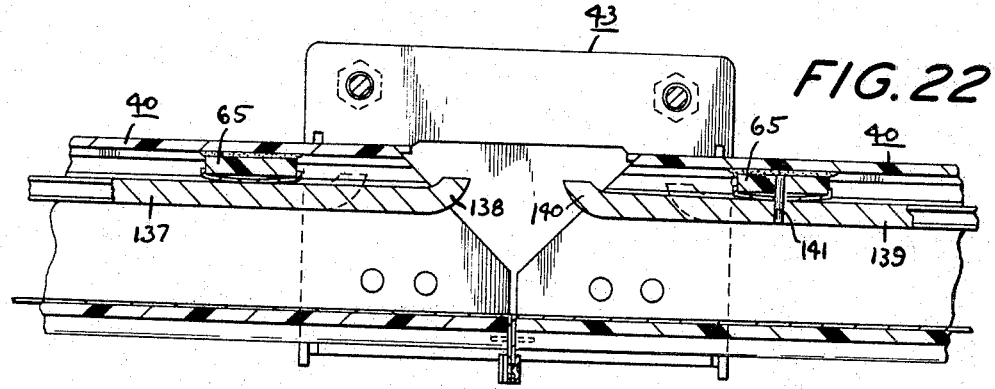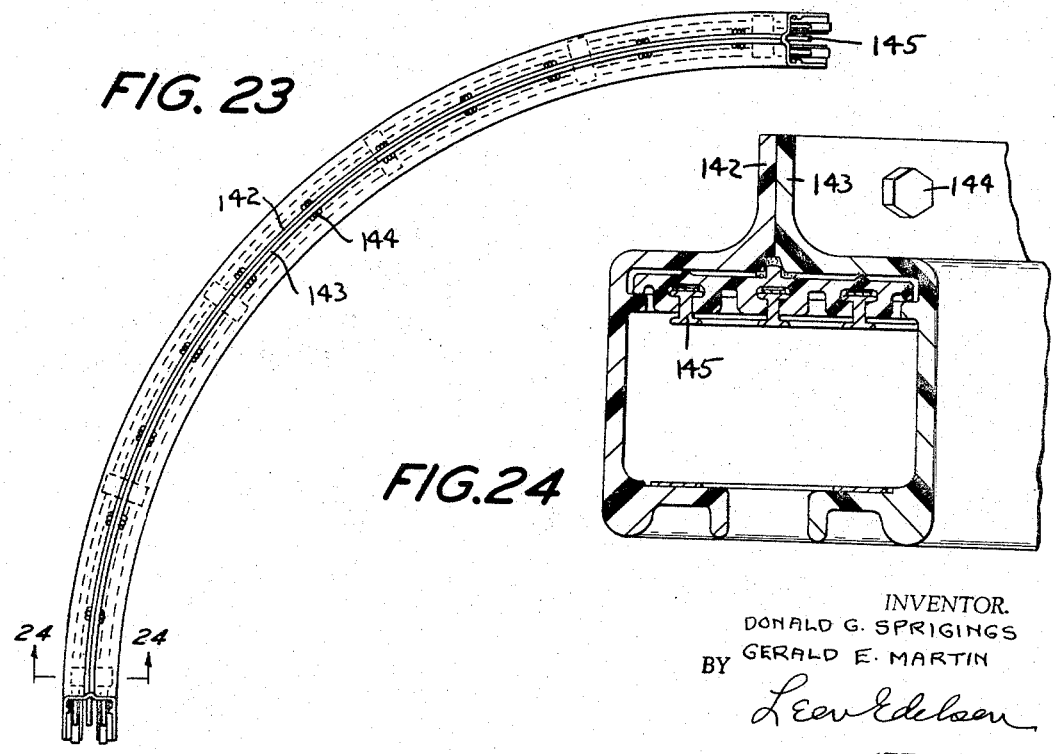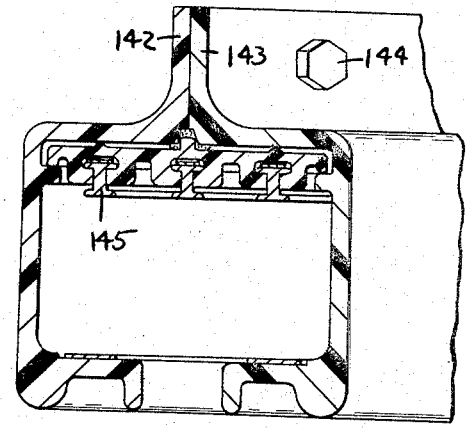

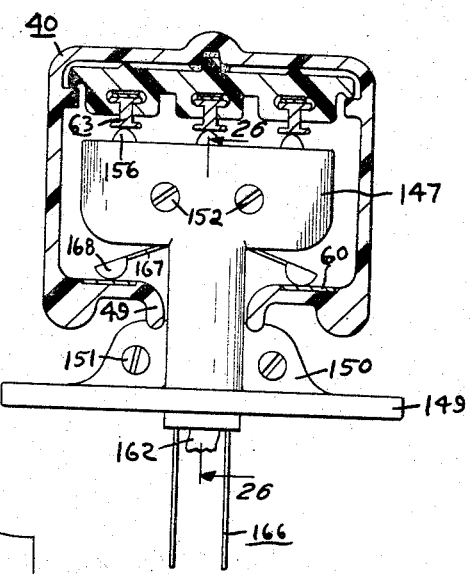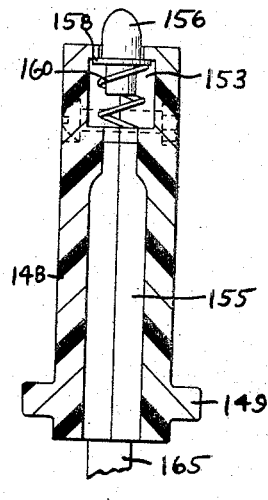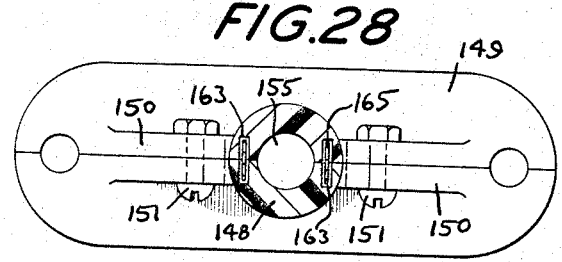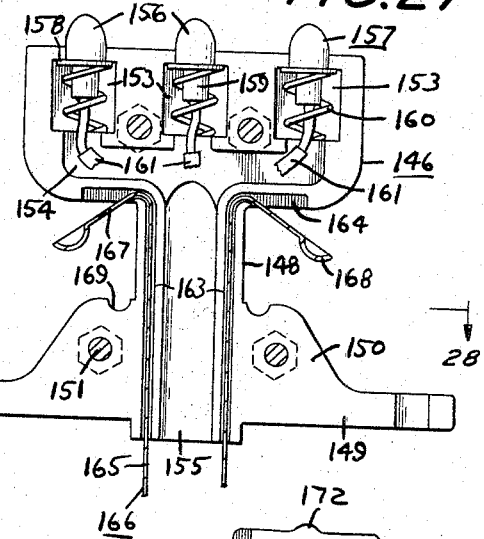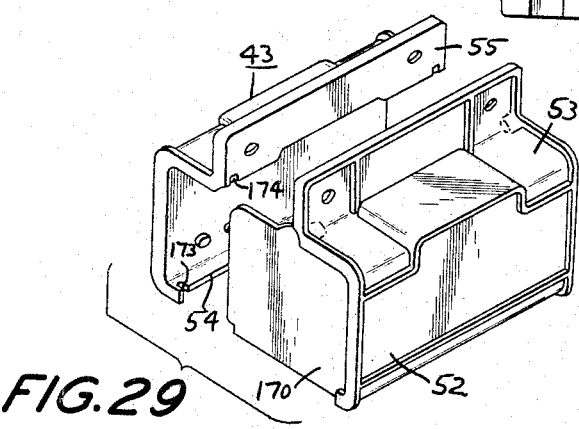

3,337,697
ENCLOSED TROLLEY BUSWAY SYSTEM
Gerald E. Martin and Donald G. Sprigings, Lynchburg, Va., assignors to H. K. Porter Company, Inc., Lynchburg, Va., a corporation of Delaware
Filed June 30, 1964, Ser. No. 379,137
9 Claims. (Cl. 191—23)

This invention relates generally to enclosed trolley busway systems, and more particularly relates to a system in which the structural support, protective housing and bus insulation are all combined into one thermosetting plastic enclosure.

The basic concept and advantages of the enclosed trolley busway system according to the present invention are set forth in the following objects, a primary object being that of providing a plastic enclosure for the system which serves as a weather cover, insulator, structural support and trolley collector track.

Another principal object of the invention is to provide a plastic enclosure as aforesaid having a high strength to weight ratio which eliminates the need for utilizing secondary insulation to thereby insure maximum electrical safety and reduce the labor costs associated with multipart assemblies, and which is formed of a high impact strength electrically non-conductive plastic material which will not dent to thereby avoid the problem of reduced interior electrical clearances if the enclosure is struck exteriorly.

A further object of this invention is to provide a novel trolley collector which incorporates wheels or skids and rides on tracks formed on the interior of the enclosure so that the trolley is supported by the enclosure and not from the current conductors to thereby render the conductor system independent of the support requirements of the trolley collector.

Yet another object of this invention is to provide a novel enclosed trolley busway system which eliminates the corrosion and maintenance problem associated with metal cover systems and which can be used both indoor and outdoor by virtue of its excellent weatherability.

Still another object of this invention is to provide a novel enclosed trolley busway system as aforesaid providing novel feeder and tap-in assemblies used in conjunction with the major system, and novel system splicing and sectionalizing structures.

The foregoing and other objects of our invention will become clear from a reading of the following specification in conjunction with an examination of the appended drawings, wherein:

FIGURE 1 illustrates a side elevational view of the enclosed trolley busway system according to the invention, shown on a reduced scale, and illustrating various gross aspects of the system;

FIGURE 2 is a vertical sectional view taken through an enclosure coupling section as would be seen when viewed along the line 2—2 of FIGURE 1, the showing of FIGURE 2 being on an enlarged scale;

FIGURE 2A is a fragmentary enlarged perspective view of the busway conductor rails and the insulating block normally secured within the housing, and which carries the rails;

FIGURE 3 is an enlarged fragmentary exploded perspective view of the busway system taken at a coupling point;

FIGURE 4 is a longitudinal vertical sectional view taken through the busway system of FIGURE 1 as would be seen when viewed along the line 4—4 of FIGURE 2;

FIGURE 5 is an enlarged cross sectional view through a conductor rail and splicing element as would be seen when viewed along the line 5—5 of FIGURE 4;

FIGURE 6 is an enlarged fragmentary side elevational view of a portion of the busway system enclosure which includes a side opening door structure by means of which the trolley collector may be inserted into the system at selected points along the length thereof;

FIGURE 7 is a vertical cross sectional view through the side door opening enclosure construction of FIGURE 6 but shown with the access door in opened position;

FIGURE 8 is a perspective view, partly exploded, of the trolley collector device which forms part of the system and which is partly visible in side elevation in the showing of FIGURE 1;

FIGURE 9 is a vertical cross sectional view, on an enlarged scale, through the busway system and associated trolley collector device as would be seen when viewed along the lines 9—9 of FIGURE 1;

FIGURE 13 is a side elevational view of the assembled structure of FIGURE 12 together with a junction box mounted thereupon and shown in vertical section;

FIGURE 14 is a vertical sectional view on a somewhat enlarged scale as would be seen when viewed along the line 14—14 of FIGURE 13;

FIGURE 15 illustrates in side elevational view one of the conductors and its connections to the busway conductor rail system and power feeder or take-off box cable connectors;

FIGURE 16 is a fragmentary perspective partly exploded view of a busway system enclosure coupling point utilizing a modified coupling section designed for mounting thereto a side positioned power take-off or feeder box;

FIGURE 17 is a side elevational view of a power take-off or feeder box secured to the side of an enclosure coupling section with the box cover broken away to show interior details;

FIGURE 18 is a vertical cross sectional view through the structure of FIGURE 17 on a somewhat enlarged scale and as would be seen viewed along the line 18—18 thereof;

FIGURE 19 is a bottom plan view looking up into the busway system enclosure with the lower portions of the enclosure broken away to show the busway sectionalizing structure;

FIGURE 20 is an enlarged top view of the sectionalized rail structure shown in FIGURE 19 and the mounting blocks associated therewith;

FIGURE 21 is a cross-sectional view through the structure illustrated in FIGURE 20 as would be seen when viewed along the line 21—21 thereof;

FIGURE 22 is a vertical longitudinal sectional view through a busway system enclosure coupling showing the upturned spaced apart ends of the bus bar conductor rails of a rail isolation section;

FIGURE 23 is a top plan view shown on a reduced scale of a curved section of the enclosed trolley busway system;

FIGURE 24 is an enlarged cross-sectional view through the busway structure of FIGURE 23 as would be seen when viewed along the line 24—24 thereof;

Figure 10:
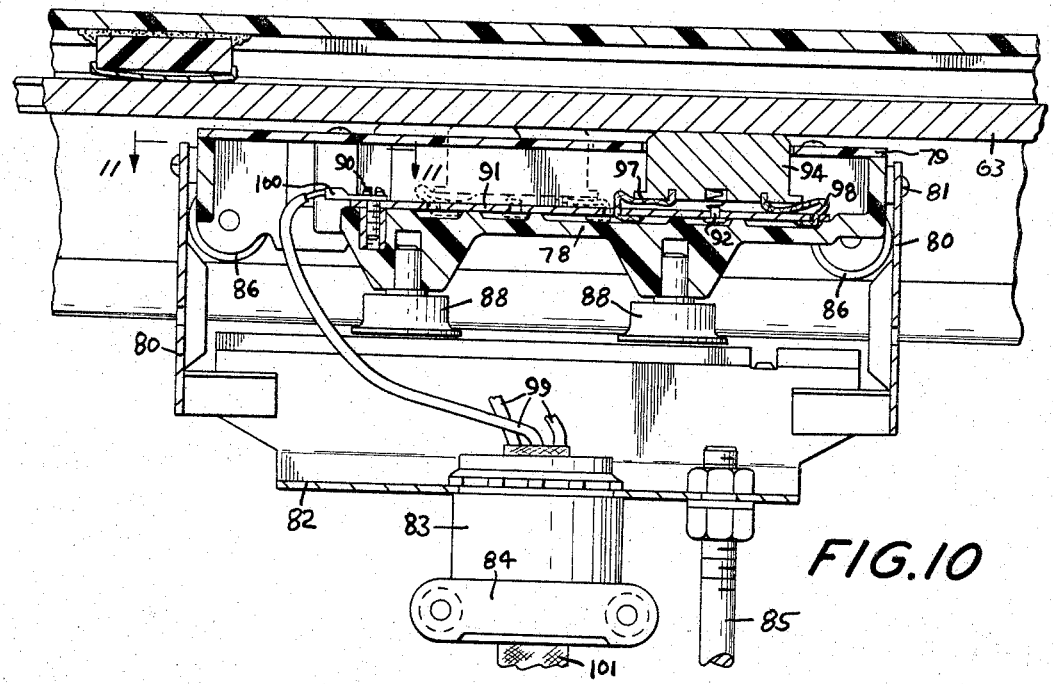
FIGURE 10 is a longitudinal vertical sectional view through the busway enclosure and trolley collector as would be seen when viewed along the line 10—10 of FIGURE 9.
Figure 11:
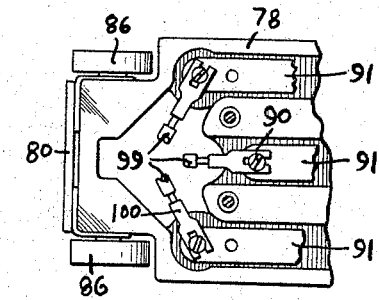
FIGURE 11 is a fragmentary plan view of the electrical connections to the trolley collector bus bar contact system taken below the insulating cover of the trolley as would be seen when viewed along the line 11—11 of FIGURE 10.

FIGURES 25 through 28 are various views of a plug-in jack power take-off structure connectable into the enclosure at any point along the length thereof, the several figures being taken as indicated by the section lines 26—26, 27—27 and 28—28 shown respectively on FIGURES 25 through 27;

FIGURE 29 illustrates in perspective an enclosure coupling section utilized as a terminating device to enclose the end of the bus bar system by the utilization of an end plate which interfits therewith, the end plate itself being shown in FIGURE 30; and FIGURES 31 through 34 illustrate various types of support hangers utilizable with the system to support the weight thereof.

In the several figures, like elements are denoted by like reference characters.

Turning now to the drawings, consider first FIGURES 1 through 5, and principally FIGURE 1. In FIGURE 1 there will be seen an enclosed trolley busway system including a longitudinally extending extruded enclosure section 40 within which rides the trolley collector designated generally as 41, the side opening access-door-containing enclosure section 42, enclosure sections couplings 43 and supporting hangers 44. FIGURES 2 through 5 illustrate the basic structural and organizational aspects of the enclosure sections 40 and enclosure coupling sections 43, all of which are formed of extruded or molded high impact strength thermosetting plastic material, such as fiberglass reinforced polyester, phonolic, melamine or other such electrically insulating compositions.

As best seen in FIGURES 2 and 3 the enclosure sections 40 are generally rectangular in cross section having an upper wall 45, opposite depending side walls 46 and a pair of inwardly projecting bottom walls 47 separated by a longitudinally centrally extending slot 48 defined by the down turned spaced apart flanges 49 which form the proximate facing edges of the bottom walls 47. The sidewalls 46 are provided near their tops with longitudinally extending inwardly projection ledges or shoulders 46' which face one another and provide physical support for the conductor rails support blocks hereinafter described. The side walls 46 and top wall 45 of the enclosure sections 40 are cut back at an angle from points on the side walls spaced somewhat upward from the bottom walls 47 so that the interior of the enclosure sections at the ends thereof are accessible from the top and sides. Punched or drilled through the side walls 46 proximate the ends thereof are apertures 50 of proper size, shape and position to have projected thereinto complementally formed buttons 51 projecting inward from the inside surface of the side walls 52 of each half of the enclosure sections coupling devices 43.

As best seen in FIGURE 2, the side walls 52, top wall sections 53 and inturned bottom walls 54 of the enclosure sections coupling devices 43 close fittingly surface engage the top, side and bottom walls of the enclosure section 40 so that the four buttons 51 of each coupling half project through the enclosure apertures 50, in the manner best seen in FIGURES 2 and 4, to interlock the ends of adjacent enclosure sections when the vertically extending flanges 55 of the enclosure coupling halves 43 are fixedly secured together by the nuts and bolts 56 projected through the aligning apertures 57. As best seen in FIGURES 3 and 4, the lower corners of the enclosure section where the side walls 46 meet the bottom walls 47 are longitudinally drilled for a distance inward from the ends as at 58, to provide pin-receiving holes 58. Pins 59 are set in the holes 58 of one enclosure section in such manner as to permit their free ends to be projected into the registering pin-receiving holes of an adjoining enclosure section to thereby lock the adjacent sections against relative vertical and lateral movement.

Extending longitudinally along and bonded downward upon the upper surface of the enclosure bottom walls 47 are flat electrically conductive strips 60 having downturned ends 61 extending below the housing bottom walls 47. As best seen in FIGURE 4, these ends 61 abut one another when two enclosure sections are interconnected, the abutting ends 61 being mechanically and electrically connected to one another by clips 62. The conductive strips 60 are connected to an electrical ground when the system is placed in operation and electrically ground the frame of the trolley collector, as will be subsequently seen, to thereby prevent any shock hazard to personnel utilizing system.

The busway conductor rails 63, as best seen in FIGURES 2 and 2A, are of I-shape in cross section and are slidable endwise longitudinally into and through grooved formations 64 formed in the conductor support block 65. The conductor support block grooved formations 64 are of the same general cross sectional shape as the upper half of the conductor rails 63, that is, such formations 64 have a horizontally extending open region of the same general shape but slightly larger than the upper flange 63a of the conductor rails and have a depending vertical slot portion of the same width as the web 63b of the conductor rails 63. Disposed within the conductor rail flange receiving portion of the grooved formations 64 are resilient biasing strips 66 which hold the conductor rails 63 in stable position within the support block 65.

The conductor rail support blocks 65 are provided with longitudinally extending side flanges 65' and top ribs 67 and 68 with the central rib 67 extending upward above the surface of the block to a greater extent than the laterally positioned side ribs 68. The support block side flanges 65' seat upon the enclosure side walls shoulders 46' to support the weight of the conductor rail system from the enclosure, this being best seen in FIGURE 2. As best seen in FIGURES 2 and 3, the support block central rib 67 projects upward into a groove 69 formed in the underside of the enclosure top wall 45 while the lateral ribs 68 are seated against the undersurface of the enclosure top wall 45. The conductor support block 65 is fixedly held in position within the enclosure by a bonding agent 70 which securely bonds the support block central rib 67 into the enclosure groove 69 in the enclosure top wall 45.

The enclosure sections 40 may be made of any convenient length as may be the conductor rails 63, but in general standard lengths will be such that enclosure sections and conductor rails will be of the same length so that mechanical coupling of the enclosures and electrical splicing of the conductor rails is accomplished at the same point, as, for example, as shown in FIGURE 4. It is of course understood that the conductor rail splicing is effected before the enclosure coupling sections 43 are secured to the end aligned enclosure sections 40. As best seen in the showing of FIGURE 3, the upper flanges 63a of the conductor rails 63 are widthwise reduced or cut down for a distance inward from the ends thereof and a conductive rail coupler 71 is slipped endwise onto the conductor rail as shown in FIGURES 3, 4 and 5.

From these figures it is observed that the rail coupler 71 is generally of inverted U-shape, having the upper central region thereof cut out to form an opening 72 and having the bottom edges turned inward and upward for a distance to lie flatwise against the inside surfaces of the side walls 73 of the coupler 71, these inwardly turned up edges being designated as 74. From FIGURE 5 it is observed that the spacing between the coupler side walls 73 is just sufficient to permit the reduced width conductor rail upper flanges 63a to pass therebetween above the turned up edges 74, the turned up length of the edges 74 being less than the vertical distance between the conductor rail upper and lower flanges 63a and 63c respectively.

Disposed within the rail coupler 71 between the side walls 73 and seated upon the upper surfaces of the conductor rail flanges 63a is a compression plate 75 having an upwardly offset central region 76 substantially lengthwise coextensive with the top central opening 72 in the rail coupler 71. Threaded downward through the upper wall of the rail coupler 71 proximate the opposite ends thereof are a pair of compression screws 77 tightenable downward upon the opposite ends of the compression plate 75 to force the latter downward upon the conductor rail upper flange 63a and clamp the flange between the underside of the compression plate 75 and the upper ends of the turned up edges 74. The upward offset 76 of the compression plate 75 prevents the compression plate from being inadvertently pushed out of the rail coupler 71 when the latter is being pushed on to the ends of the conductor rails immediately prior to tightening the compression screw 77.

Before examining the side access door enclosure section 42 for introducing a trolley collector to the bus bar system attention should be first directed to the structure of the trolley collector itself and its organization within the usual enclosure sections 40. For this purpose reference should be now made to the showings of FIGURES 8 through 11. The trolley collector 41 includes the collector shoes carrying insulator body 78 and upper insulating cover plate 79, and a depending electrically conductive structure formed of metal parts and including the opposite end plates 80 physically secured to the insulator body 78 as by means of the screws 81 and welded or otherwise secured at their lower ends to a cable clamping bushing support 82 extending therebetween. The cable clamping bushing 83 with its screw supported clamping plate 84 are best seen in the showings of FIGURES 9 and 10. Also fixedly secured to and extending downward from the bushing support 82 is an eye bolt 85 to which may be secured a cable or rod (not shown) by means of which the trolley collector 41 may be manually moved along the busway system to the desired location.

Rotatably secured at the four corners of the insulator body 78 are conductive metal wheels 86 electrically connected to the conductive end plates 80 and bushing support 82 by the conductive straps 87. As best seen in the showing of FIGURE 9, the trolley wheels 86 are seated upon and ride along the electrically conducting flat grounding strips 60 of the enclosure sections so that the entire depending structure of the trolley collector 41 is electrically grounded and thus presents no shock hazard to personnel.

Rotatably secured to depending legs of the insulator body 78 for rotation in a horizontal plane are a pair of longitudinally spaced wheels 88 so vertically positioned as to be disposed between the down-turned slot defining enclosure flanges 49. The effective wheel diameter is just slightly less than the slot width so that the wheels will roll if they engage either of the flanges 49 but will not normally engage both simultaneously.

The insulator body 78 is provided with three laterally spaced parallel slotted channels molded or cut downward into the body from the upper surfaces thereof and designated generally as 89. Extending longitudinally along the bottom of each such channel 89 and secured to the insulator body 78 as by means of the screws 90 are the conductive metal strips 91 through which are upwardly projected the locating pins 92. Centered by the pins 92 and extending upwardly therefrom are the compression springs 93 having their upper ends disposed in bottom recesses formed in the collector shoes 94, which latter are generally rectangular in shape when viewed in plan, having their longitudinally disposed opposite ends chamfered as at 95.

The collector shoes 94 are of the same general size and shape in horizontal cross section as the slotted apertures 96 cut through the insulator cover plate 79 so that the springs 93 bias the collector shoes upward through the rectangular openings 96 and into engagement with the current conductor rails 68, as see in FIGURES 9 and 10, the collector shoes 95 being prevented from projection out of the trolley by means of the lower peripheral flanges 97 formed on the shoes which engage the underside of the insulator cover plate 79 in any case where the spring 93 is enabled to elevate the collector shoe 94 to such a point. Good electrical contact between the collector shoes 94 and conductive metal strips 91 is provided by the metallic braid 98 interconnecting the shoe with the strip.

The electrical current is carried from the conductive strips 91 to its point of utilization through the electrical conductors 99 secured by spade lugs 100 thereto, the conductors 99 passing downward through the bushing 83 into the cable 101. As best seen in the showing of FIGURE 8, the trolley collector is illustrated as being provided with three laterally spaced collector shoes 94 with one such shoe being provided for engagement with each of the conductor rails 63 in the manner seen in FIGURE 9. Heavier current carrying capacity for the trolley conductor is readily accomplished by providing the trolley collector with additional collector shoes 102 to provide a pair of shoes in tandem relation for each conductor rail, as is best illustrated in the showing of FIGURE 8 in phantom outline, such additional shoes being projectable through rectangular openings which would be cut through the insulator cover plate 79 in the region designated as 103. Each such additional collector shoe would of course be connected electrically in parallel with the collector shoe 94 with which it is in tandem or longitudinal alignment.

Turn now to a consideration of FIGURES 6 and 7 which illustrate in detail the side access door enclosure section designated generally as 42 in the showing of FIGURE 1 which is utilized for insertion and removal of the trolley collector structures 41 points along the length of the busway system. From FIGURE 7 it is observed that the side access enclosure section is basically the same as the enclosure sections previously described and illustrated generally as 40. The side access door section 42 has a top wall generally designated as 45a and bottom walls 47a which are in all regards the same as the corresponding parts of the regular enclosure sections. The side walls, however, while being of the same cross sectional shape as the side walls 46 of the standard enclosure section, are split into two vertically positioned parts 46a and 46b, the upper part 46a being of relatively short vertical extent so that the door section 46b is of sufficient height to permit the trolley collector to be inserted and removed.

The access door section is of course also provided with the electrically conductive flat strips 60a having down-turned ends 61a, these conductor strips necessarily terminating at the ends of the fixed side wall portions of the access door section immediately adjacent to the opposite ends of the access door itself since extension of the conductive ground strips would prevent the access doors from being opened. In order to maintain grounding continuity of the trolley connector whenever such might be positioned on the access door region itself of such a section 42, the grounding strips 60a are electrically connected to similar grounding strips 107 carried by the door section through the hinge structure which secures the access door to the enclosure.

The hinge structure is made of metal and include an upper leaf 104a fixedly secured to the upper wall section 46a as by means of screws 105, and a lower leaf 104b fixedly secured to the swingable lower side wall section 46b as by means of the rivets 106, these latter rivets 106 also electrically connecting the hinge lower leaf to the ground strips 107 carried by the swingable side door section. Electrical continuity between the upper leaf 104a of the side door hinge section and the conductive ground strips 60a is provided by the electrical conductor 108 having eye lugs 109 affixed thereto at opposite ends and secured respectively to the hinge leaf 104a and conductive strip down turned end 61a by the screw 105 and rivets 110.

Mechanical securement of the access door in its operative position is provided by forming the lower edge of the hinge leaf 104b with a loop 111 within which are disposed a pair of barrel bolts 112 shiftable longitudinally endwise in opposite directions into receiving loops 113 carried by plates 114 fixedly secured to the enclosure side walls by rivets 115 at points immediately adjacent to the opposite ends of the door section.

Figure 12:
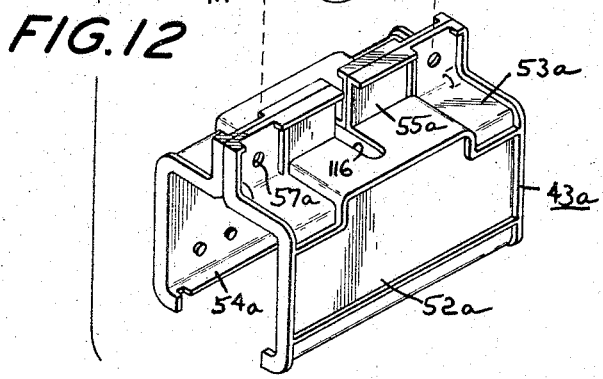
FIGURE 12 is a partly exploded perspective view of a power feeder of take-off mounting base and the modified busway enclosure coupling structure utilized therewith.

FIGURES 12 through 18 illustrate structures for tapping into the busway system as for example to provide electrical power feed points, FIGURES 12 through 15 illustrating a top mounted connection structure while FIGURES 16 through 18 illustrative a side mounted connection structure. Consider first FIGURES 12 through 15, reference being first made to the showing of FIGURE 12 illustrates an enclosure sections coupling 43a which is a modified form of the enclosure sections couplings 43 previously described and shown in FIGURES 1 to 3, the coupling having side walls 52a, top wall 53a, inturned bottom walls 54a, and upstanding flanges 55a provided with bolting apertures at opposite ends thereof designated generally as 57a.

The coupling structure 43a differs from the previously described couplings 43 in that the power feeder coupling is transversely vertically slotted substantially centrally downward through the vertical flanges 55a and the top walls 53a to provide an open slot access opening 116. Additionally, the horizontal top web of the vertical flanges 55a is cut away at the end regions above the bolting apertures 57a so that the parallel spaced legs 117 which depend from the insulator mounting plates 118 are slidable close fittingly downward on opposite sides of the coupling flanges 55a. It will be noted that the composite mounting plate is formed from two of the insulator plates 118 which are butted and secured together in the manner most clearly seen in FIGURES 12 and 13.

Each of the mounting plates 118 is further provided with three spaced rectangular notches 119 which form conjointly with the notches of the other mounting plate secured thereto three rectangular openings through which are vertically projected the formed conductor bars 120, which latter also extend downward through the access slot 116 in the coupling section 43a and are electrically secured at their lower ends by soldering to the central region 76 of the compression plate portion of the rail couplers 71, this latter detail being most clearly seen in the showings of FIGURES 14 and 15. The insulator mounting plates 118 are also provided with depending support legs 117a which seat upon the top wall 53a of the enclosure coupling 43a to aid in mechanically supporting the feeder box 121 which is decured downward upon the upper surface of the insulator mounting plates 118 as by means of the machine screws and nuts 122. As seen in FIGURE 13, the legs 117a may be apertured and used to bolt together the two insulator mounting plates 118, or these plates may be bonded together by means of a bonding agent.

As best seen in FIGURES 13 and 14 the feeder box 121 has four side walls and an open top and bottom, the side walls being turned inward at the tops and bottoms to provide flanges for mounting the feeder box to the insulator mounting plates 118 and for permitting a removal top cover plate 123 to be secured thereupon as by means of the machine screws 124. The feeder box 121 is also provided with clamping terminals 125 to which the upper ends of the feeder conductors 120 are secured as by means of the set screws 126. One of the side walls of the feeder box 121 is also provided with a cable clamp bushing 127 through which the feeder lines may be brought. The composite feeder box and mounting plate structure is secured to the enclosure coupling 43a by means of the nuts and bolts 128 projectable through the coupling flange apertures 57a and which clamp the insulator mounting plate legs 117 thereto.

Turn now to a consideration of FIGURES 16 through 18 illustrating the side mounted feeder box structure which consists of a feeder box enclosure 121′ similar to the previously described feeder box 121 and which is mounted upon a flat insulator mounting plate 129 which latter is in turn bonded to one side wall 52b of an enclosure coupling 43b. The enclosure coupling 43b is best seen in the showing of FIGURE 16 and is observed to differ from the standard enclosure coupling 43 only in that one side wall 52b is provided with three side by side vertically extending elongated apertures 130. The insulator mounting plate 129 which is bonded thereto is similarly provided with three elongated apertures 131 alignable with the apertures 130 so that the feeder conductors 132 may extend therethrough from the interior of the feeder box 121′ for securement to the respective conductor rails 63, as by means of soldering. It is seen from the showing of FIGURE 16 that the conductor rails 63 are unbroken in the region of the enclosure coupling. This may be readily effected by providing enclosure sections 40 of lengths different from that of the conductor rails 63.

Consider now FIGURES 19 through 21 which illustrate the structures for sectionalizing the busway system or dividing the system into individually electrically energized sections as for example by means of the several feeder structures previously described. From the underside view of FIGURE 19 and the top side view of FIGURE 20 it is observed that the left hand set of conductor rails 134 are spaced end-wise with respect to one another while being longitudinally aligned so that an insulating air gap exists between the corresponding conductor rails of each set. The length of the air gap is less than the length of one of the collectors shoes 94 of the trolley collector 41 so that such a collector shoe bridges the gap between adjacent conductor rails as the collector trolley 41 moves from the set of rails 133 to the set of rails 134, or vice versa. Thus, if one set of rails is deenergized while the other set is energized, the bridging connection effected by the trolley collector shoes will momentarily energize the deenergized section, but the bridging connection is of course broken as the collector trolley moves beyond the region of the air gap. The sectionalizing permits the system to be fed from several feed points so as to reduce the voltage drop in a manner similar to that employed for long track systems in which various utilities may be drawing considerable power at intermediate points and therefore reduce the available potential at a more remote point.

In order to prevent the conductor rails from possible longitudinal movement relative to one another which could of course undesirably lengthen the air gap or completely eliminate the same, the conductor support blocks 65a are utilized. These support blocks 65a are basically the same as the previously described support blocks 65 best illustrated in the showing of FIGURE 2A, the support blocks 65a differing therefrom in that each of the central ribs 67 and lateral ribs 68 are drilled and counterbored vertically to accommodate machine screws 135 projected downward therethrough and threaded into tapped holes in the conductor rails 133 and 134, as best seen in FIGURE 21. The screws 135 thus fixedly anchor the conductor rails 133 and 134 to the support blocks 65a and prevent relative motion therebetween. The abutting edges of the support blocks 65a are then bonded together along the line 136 best seen in FIGURE 20. In general, the support blocks 65a will not have their central ribs 67a bonded into the housing top groove 69. Moreover, while not mandatory, the sectionalizing structure may be located at the junction of a pair of enclosure sections so as to be enclosed within an enclosure sections coupling 43 for ready access.

FIGURE 22 illustrates an isolation section which is similar to the just described sectionalizing assembly excepting that the collector shoes of the trolley collector cannot bridge the gap between the ends of longitudinally adjacent conductor rail sections. Therefore, if one section is deenergized for carrying out maintenance work, the trolley cannot form an electrical bridge and energize the section which has been deliberately deenergized so that the personnel working at this section cannot be accidentally shocked. The distance between the ends of the isolating section conductor rails is such that bridging cannot occur even in the event that the trolley collector is provided with two shoes per conductor rail connected in parallel.

As shown in FIGURE 22, an enclosure coupling section 43 intercouples a pair of enclosure sections 40 with the left hand group of conductor rails 137 being slidably held in position within the enclosure by the previously described conductor support block 65. The ends of the conductor rails 137 are curved upward as at 138 so that the chamfered end of the collector shoes 94 will engage the curved surface of the rail and cam the collector shoe downward so that it slides inward under the conductor rail instead of locking in an immovable end abutting position. The right hand set of conductor rails 139 are similarly provided with upcurved ends 140 for the same purpose. The conductor rails 139 are supported by a support block 65 of the type previously described, but a pin 141 is projected through the conductor rails into locking engagement with the support block in order to anchor the rail ends and prevent material changes in the gap length between the corresponding ones of the conductor rail groups 137 and 139. The pins 141 are used only at one end of each isolation section in order to accommodate for any slight differences in the rates of thermal expansion of the conductor rails and the enclosure sections 40 although the composition of the plastic housing can be controlled so as to provide a thermal expansion rate substantially equal to that of copper and thereby eliminate any differential expansions.

In the showing of FIGURE 22, the spacing between the upturned rail ends 138 and 140 is determined by whether the trolley collector 41 utilizes one or two collector shoes per rail. If only one collector shoe per rail is employed then an end spacing as for example shown in the solid line showing would be employed, whereas if two collector shoes per rail are employed then the end spacing between the rails would be increased in the manner shown for example by the phantom line showing superimposed on FIGURE 22.

FIGURES 23 and 24 illustrate typical curved sections of the enclosed trolley busway system according to the invention from which it is observed that the curved sections are two part units having vertically extending flat surface conforming top flanges 142 and 143 secured fixedly together as by means of nuts and bolts 144, the flanges 142 and 143 being associated respectively with the outside curved section and the inside curved section enclosure halves which together form the complete curved enclosure section. The conductor rails 145 are of course curved at the same rate in order to fit properly within the housing enclosures. Comparison of FIGURE 24 with FIGURE 2 discloses that these enclosure structures are otherwise the same.

Consider now FIGURES 25 through 28 which illustrate a plug-in jack structure which may be connected into the busway system at any desired point by insertion upward through the enclosure bottom slot to provide a fixed position electrical tap-off. The plug-in jack unit, designated generally as 146, is generally of T-shaped configuration having a head 147 and a stem 148 from the bottom of which latter laterally extends a handle portion including a flat horizontal flange 149 and a vertical web 150 integrally formed with the lower portion of the stem 148 and the horizontal flange 149.

As best seen in FIGURES 26 through 28, the body of the plug-in jack unit is formed of two identical vertically extending halves made of electrical insulating plastic material and which are secured together by the nuts and bolts 151 projected through the vertical web portions 150 of the jack handle and by the nuts and bolts 152 projected through the head portion 147 of the jack unit. The head 147 of the jack unit is formed with three vertically extending cavities 153 open at the top and bottom, and with the bottom openings communicating with a horizontally extending cavity 154 which in turn communicates with the open bottomed bore 155 extending vertically through the stem 158 from the bottom thereof.

The top and bottom open ends of the vertical cavities 153 are of smaller cross-section than the cavities themselves, the heads 156 of the conductor rails electrical contact elements 157 projecting freely upward through the top openings of the cavities 153 while the flanged portions 158 formed at the bottom of the heads 156 extend laterally thereof and are too large to move upward through the cavity top opening and thereby retain the contact elements within the cavities. Extending downward from the contact element flanges 158 are stems 159 about which are disposed helical compression springs 160 which have their upper ends seated against the underside of the flanges 158 and their lower ends seated on the bottoms of the cavities 153. The springs 160 bias the heads of the contact elements upward so that the latter are vertically resiliently shiftable. Electrically secured to and extending downward from the contact elements 157 into the cavity 154 are electrical conductors 161 which are formed into a cable 162 and extended downward through the vertical bore 155 and out of the bottom of the stem 148. The cable and conductors contained therewithin are of course terminated in any convenient manner useful for connection to a utility to be operated.

Also formed in the stem 148 and extending vertically parallel to the bore 155 on opposite sides of the latter are a pair of rectangular slots 163 which open through the bottom of the stem 148 and turn laterally outward in opposite directions at the top of the stem to merge with horizontally extending open bottomed cavities 164 as formed in the bottom of the head 147. Extending vertically upward through each of the rectangular slots 163 from a point below the bottom edge of the stem 148 is the vertical leg 165 of a spring metal grounding strip 166, the upper ends of the grounding strip vertical legs 165 then turning laterally outward into the cavities 164 and merging with angularly laterally outwardly extending legs 167 of the grounding strips 166, the outer ends of the downwardly angled legs 167 terminating in upwardly dished contact cups 168. As best seen in FIGURE 25, the contact cups 168 are engaged with the enclosure grounding strips 60 when the plug-in jack unit 146 is operatively engaged with the busway system so that the externally accessible lower ends of the vertical legs 165 of the grounding strips 166 are at electrical ground potential.

As is best seen in the showing of FIGURE 26, the jack head 147 and stem 148 are of the same width, and, as best seen in FIGURE 25, this width is just slightly less than the width of the enclosure slot between the enclosure lower flanges 49. Moreover, the downward angulation of the grounding strip legs 167 of the plug-in jack unit is observed to be greater in the showing of FIGURE 27 than in the showing of FIGURE 25. This results from the fact that the distance between the underside of the dished contact cups 168 and the upper surface of the electrical contact element heads 156 is greater than the vertical distance within the enclosure 40 between the upper surface of the grounding strips 60 and the under surface of the conductor rails 63.

Consequently, when the plug-in jack is inserted upward into the enclosure 40 through the bottom slot it must be inserted sufficiently upward to cause the electrical contact elements 157 to engage the center conductor rail and be depressed downward somewhat into the plug-in jack head against the bias of the compression springs 160 in order to permit the dished contact cups 168 of the grounding strips 166 to cam upward and inward over the enclosure flanges 49 as the plug-in jack unit is rotated through 90° into the position shown in FIGURE 25. Once the contact cups have been cammed up onto the flanges 49 of the enclosure 40, the plug-in jack may be pulled slightly downward by means of the handle flange 149 so that the lower ends of the enclosure flanges may clear the upper edges of the plug-in jack vertical webs 150 and then drop into the receiving notches 169 recessed downward from the upper edges of these vertical webs 150.

The engagement of the contact element heads 156 with the conductor rails 163 causes the compression springs 160 to tend to drive the entire plug-in jack unit 146 downward, but this drive is offset by the resilient action of the grounding strips 166 which tend to drive the plug-in jack unit upward by reason of the engagement of the dished contact cups 168 with the enclosure grounding strips 60. The upward drive of the resilient grounding strips 166 overbiases the downward drive of the compression springs 160 so that the plug-in jack unit moves vertically upward into its stable position in which the enclosure flanges 49 are seated within the web notches 169, the drive of the compression springs 160 insuring a good contact between the heads of the electrical contact elements and the above lying conductor rails 63.

FIGURE 29 illustrates an enclosure coupling section 43 of the type previously described in detail, such coupling section being also utilizable to form a closed end for the trolley busway system by assembling thereto an end closure plate 170 as illustrated in the showing of FIGURE 30. The end closure plate 170 is notched as at 171 at its opposite lower corners and is provided with a projection 172 extending upward from the central region of the upper edge of the closure plate. The inturned bottom walls 54 of the coupling section 43 are provided with notches 173 just inward of its end flanges, and the coupling is likewise notched as at 174 at the lower edges of its vertical flanges 55 just inboard of the end flanges. As seen in FIGURE 29, the end closure plate 170 is of the same cross-sectional area as the interior of the coupling 43, with the notches 171 and projection 172 positioned to respectively interfit with the notches 173 and 174 of the coupling. This interfit prevents movement of the closure plate relative to the coupling section 43 when the two halves of the latter have been bolted together in the aforedescribed manner.

FIGURES 31 through 34 illustrate various types of busway system enclosure hanger devices which may be utilized for suspending the enclosed busway system from various types of supporting structures. All of the hanger devices, designated respectively in FIGURES 31 through 34 as 175, 176, 177 and 178, are formed from two identical vertical halves bolted together as by means of the bolts 179, 180, 181 and 182 respectively.

Figure 31:
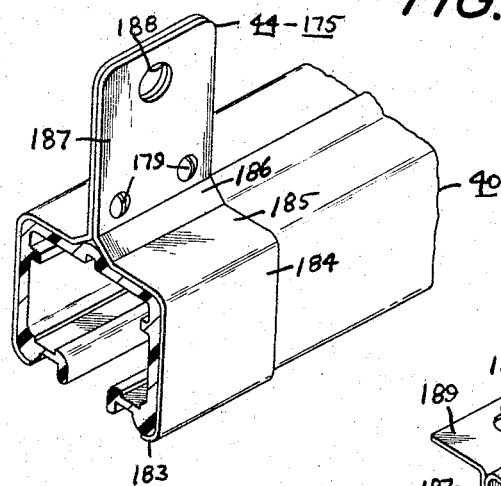

Referring to FIGURE 31, it is observed that each of the hanger half sections have a bottom flange 183 turned in under the enclosure bottom wall, a vertically extending side part 184 extending upward in flat surface contact with the outer side-wall of the enclosure, which side part at its upper end turns inwardly over the enclosure top wall and is designated 185, extending inwardly until it encounters the top central ridge of the enclosure 40 at which it angles upward for a short distance as the angled section 186. The hangers of FIGURES 32 and 33 all include similarly shaped parts designated with the same reference characters excepting that appended thereto is the lower case letter "a" or "b" to designate respectively those parts of the hangers of FIGURES 32 and 33.

Extending vertically upward from the upper edges of the angled sections 186 are the flat surface engaged vertical parts 187 punched through in FIGURE 31 proximate their upper edges as at 188. The hanger 175 may be secured to any depending support member by means of bolts projected through such support member and the aperture 188 of the vertical hanger parts.

Figure 32:
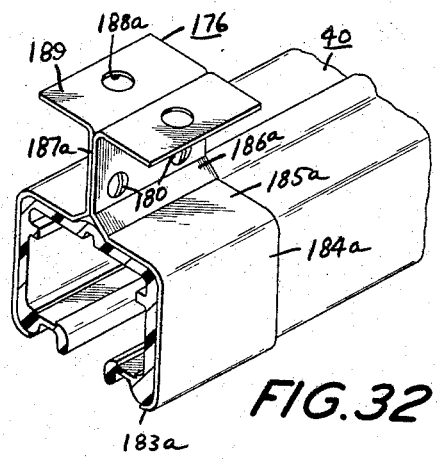

The hanger of FIGURE 32 may be formed from that of FIGURE 31 by bending into a horizontal plane, as at 189, the upper portions of the vertically extending hanger parts 187a which project upward from the top of the angled sections 186a, the punched through holes designated as 188a rendering the horizontal flange parts 189 suitable for securement to an overhead support such as a ceiling or the underside of a beam.

Figure 33:
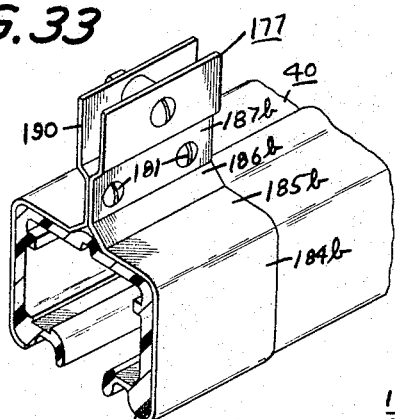

FIGURE 33 illustrates another variation in which the upper portion of the hanger vertical parts 187b are laterally outwardly offset as at 190 to provide a channel like opening into which may be projected and secured a support member.

Figure 34:
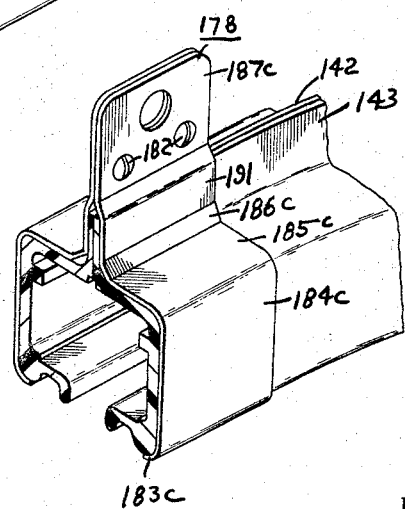

The upper portion of the hanger 178 of FIGURE 34 differs from that of the hanger 175 of FIGURE 31 in only two minor particulars, this hanger 178 also having corresponding parts 183c, 184c, 185c and 186c. Firstly, the vertically extending parts of the hanger which project upward from the upper edges of the angled lower regions so as to provide a channel like opening for acceptance of the vertically extending flanges 142 and 143 of the busway enclosure curved sections illustrated in FIGURES 23 and 24. Secondly, the bolting holes for the nuts and bolts 182 are formed in the upper portion of the vertically extending hanging part 187c so as to clear the enclosure flanges. All of these hangers while snugly enclosing their respective enclosure sections do not fit so tightly thereabout as to restrict longitudinal movement of the busway enclosure sections through the hangers, such movement being desirable for purposes of adjustment and to accommodate thermal expansions and contractions of the busway system without setting up any attendant mechanical stresses or strains in either the enclosure sections or the hangers.

Finally, it is of importance to note that the modular enclosure sections are formed of such thermosetting material as above mentioned as provide high strength to weight ratio, high dielectric value, high resistance to fire, high arc track resistance, excellent outdor weatherability, high impact and beam strength and a coefficient of expansion closely approximately that of the conductor rails themselves. The construction of the enclosure is further such that upon assembly of the modular components thereof as hereinbefore described, it provides a unitary enclosure of effectively rain-tight construction which serves not only as a weather cover and electrical insulator, thereby eliminating all need of secondary insulation while insuring maximum electrical safety, but also constitutes in itself an exceedingly strong but light weight strutural beam for supporting the conductor rails and the current collector trolley riding thereon.

Having now described our invention in connection with particularly illustrated embodiments thereof, it will be appreciated that modifications and variations thereof may now occur from time to time to those persons normally skilled in the art without departing from the essential scope or spirit of our invention, and accordingly it is intended to claim hte same broadly as well as specifically as is indicated by the appended claims.

What is claimed to be new and useful is:

1. In an enclosed conductor system of the character described, a plurality of modular components for such system each comprising a conductor enclosure section formed of thermo-setting plastic material of high impact and beam strength and non-conductive of electrical current, said section being generally of hollow rectangular shape in transverse cross-section and having a substantially horizontal top wall and substantially vertical side walls which respectively terminate in inturned coplanar flanges to provide the section with a bottom wall having a slot of limited uniform width extending along the full length of the section midway between the side walls thereof, the top wall of said section being provided internally thereof at spaced intervals above the length thereof with a plurality of laterally spaced longitudinally extending parallel grooves of generally T-shaped transverse sections for respectively receiving therein in electrically insulated relation the upper portions of a plurality of I-shaped conductor rails, the upper surfaces of said inturned bottom flanges being respectively faced with current grounding strips extending the full lengths of said flanges to provide grounded supporting tracks for a current collecting device movable within said enclosure in electrical contact with said rails, and means for detachably coupling in longitudinal alinement adjoining ones of said sections and adjourning grounding strips thereof to provide an enclosure with electrically continuous grounding strips of any desired length.

2. The enclosed conductor system as set forth in claim 1 wherein a length of at least one side wall and its associated bottom wall of an enclosure section are cut out of the latter and secured thereto by an electrically conductive hinge unit having one hinge leaf secured to the outer side-wall of the cut out section by means of an electrically conductive pin passing therethrough and having the other hinge leaf secured to the remaining upper portion of the outer side-wall of the enclosure section, the hinge leaves being so secured that the hinge pintle is horizontally positioned so that the cut out side wall portion may swing vertically downward into alignment with adjusted portions of the side-walls and bottom walls and act as a continuation thereof or may be swung vertically outward and upward to provide a side access door to the interior of the enclosure section, said access door carrying a grounding conductor coextensive with the door length and electrically connected to said conductive hinge by engagement with said conductive pin securing said one hinge leaf to said access door, electrical conductor means electrically interconnecting said grounding conductors of said enclosure section on the one hand and said electrically conductive hinge on the other hand, selectively operable locking means carried partly by said access door and partly by said enclosure side-walls immediately adjacent thereto effective to lock said access door and prevent upward swinging motion thereof when the door is in its downwardly swung closed position.

3. In an enclosed conductor system made up of a plurality of interconnected modular assemblies secured together in longitudinal alignment to provide a conductor system of any desired length for supply electrical power at any point along the length of the system,
(a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turns inwardly toward one another at their bottom edges to form a pair of longitudinally extending bottom walls which define therebetween a central longitudinally extending slot of substantially constant width, said side walls being internally provided with a pair of opposed longitudinally extending inwardly projecting ledges spaced below said top wall, and said top wall being provided with a longitudinally extending groove recessed upward thereinto from the underside thereof,
(b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said support blocks having longitudinally extending opposite side flanges adapted to seat upon said enclosure side wall ledges when said support blocks are slid endwise into said enclosure and also each having a top rib extending upward from the upper surface of said support block into the said groove recessed into said enclosure top wall,
(c) bonding means fixedly securing said conductor rails support blocks to said enclosure sections along the length of the latter by bonding said support blocks top ribs into the said groove of said enclosure.

4. In an enclosed conductor system made up of a plurality of interconnected modular assemblies secured together in longitudinal alignment to provide a conductor system of any desired length for supplying electric power at any point along the length of the system,
(a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turn inwardly toward one another at their bottom edges to form a pair of longitudinally extending bottom walls which define therebetween a central longitudinally extending slot of substantially constant width, said side walls being internally provided with a pair of opposed longitudinally extending inwardly projecting ledges spaced below said top wall, at least one of said enclosure sections being longitudinally curved and formed from two lateral halves disposed on opposite sides of the vertical median plane of the enclosure and having vertical flanges extending upwardly from the longitudinally extending inner edges of the top wall of each of said enclosure halves, which flanges are surface engaged throughout their longitudinal extent and are bolted together to form the enclosure section,
(b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said support blocks having longitudinally extending opposite side flanges adapted to seat upon said enclosure side wall ledges when said support blocks are slid endwise into said enclosure sections, and
(c) means fixedly securing said conductor rails support blocks to said enclosures along the length of the latter, and
(d) grounding conductors carried by the bottom walls of each of said enclosure sections, said grounding conductors of adjoining enclosure sections being electrically connected in longitudinal alinement to provide the conductor system with electrically continuous ground means effective to protectively ground a work utility connected into the system at any point along the length thereof.

5. In an enclosed conductor system made up of a plurality of interconnected modular assemblies secured together in longitudinal alignment to provide a conductor system of any desired length for supplying electrical power at any point along the length of the system,
(a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turn inwardly toward one another at their bottom edges to form a pair of longitudinally extending bottom walls which define therebetween a central longitudinally extending slot of substantially constant width, said side walls being internally provided with a pair of opposed longitudinally extending inwardly projecting ledges spaced below said top wall, (b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said support blocks having longitudinally extending opposite side flanges adapted to seat upon said enclosure side wall ledges when said support blocks are slid endwise into said enclosure, (c) means fixedly securing said conductor rails support blocks to said enclosures along the length of the latter, (d) conductive grounding tracks carried by said enclosure bottom walls and being coextensive with the length of said enclosure section, the grounding tracks of coupled end-butting enclosure sections being electrically coupled together, and (e) means insertable into said enclosure sections for tapping-off electrical power therefrom including externally connectable contact elements engageable with said conductor rail sections and externally connectable grounding means engageable with said grounding tracks.

6. In an enclosed conductor system made up of a plurality of interconnected modular assemblies secured together in longitudinal alignment to provide a conductor system of any desired length for supplying electric power at any point along the length of the system, (a) a plurality of enclosure sections of hollow generally rectangular cross section unitarily formed of electrical insulation material each having a substantially horizontal top wall from which substantially vertically depend at opposite longitudinally extending sides thereof a pair of longitudinally extending sidewalls which turn inwardly toward one another in the same plane at their bottom edges to form a pair of longitudinally extending bottom walls having facing edges formed by downturned spaced apart flanges which define therebetween a central longitudinally extending slot of substantially constant width, said side walls being internally provided proximate their upper ends with a pair of opposed longitudinally extending inwardly projecting ledges spaced the same distance below said top wall, and said top wall being provided with a longitudinally extending groove recessed upward thereto from the underside thereof, (b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said support blocks having longitudinally extending opposite side flanges adapted to seat upon said enclosures side-wall ledges when said support blocks are slid endwise into said enclosure and also each having a top rib extending upward from the upper surface of said support block into the said groove recessed into said enclosure top wall, (c) insulator material coupling means detachably coupling together longitudinally end abutting ones of said plurality of enclosure sections, (d) electrically conductive rail coupler means electrically and mechanically coupling end aligned ones of said conductor rails sections, (e) means fixedly securing said conductor rails support blocks to said enclosures along the length of the latter, (f) conductive grounding tracks carried by said enclosure bottom walls and being coextensive with the length of said enclosure section, the grounding tracks of said coupled end abutting enclosure sections being electrically coupled together, (g) means insertible into said enclosure sections for tapping off electrical power therefrom including externally connectible contact elements engageable with said conductor rails sections and externally connectible grounding means engageable with said grounding tracks, (h) and power feeder means mechanically carried by at least one of said enclosure sections and electrically connected to at least some of said conductor rails sections through which electrical power is fed to said conductor rails.

7. In an enclosed conductor system made up of a plurality of interconnected modular assemblies secured together in longitudinal alignment to provide a conductor system of any desired length for supplying electrical power at any point along the length of the system, (a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turn inwardly toward one another at their bottom edges to form a pair of longitudinally extending bottom walls which define therebetween a central longitudinally extending slot of substantially constant width, said side walls being internally provided with a pair of opposed longitudinally extending inwardly projecting ledges spaced below said top wall, (b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said support blocks having longitudinally extending opposite side flanges adapted to seat upon said enclosure side wall ledges when said support blocks are slid endwise into said enclosure, (c) means fixedly securing said conductor rails support blocks to said enclosures along the length of the latter, (d) conductive grounding tracks carried by said enclosure bottom walls and being coextensive with the length of said enclosure section, the grounding tracks of coupled end-butting enclosure sections being electrically coupled together, and (e) power tap-off means operatively associated with said enclosed conductor system, said power tap-off means including one set of contact elements respectively engageable with said conductor rail sections for supplying electrical power to a work utility and a second set of contact elements respectively engageable with said grounding tracks for placing at ground potential all conductive parts of said power tap-off means which are exposed externally of the rail enclosing sections of the conductor system.

8. In an enclosed conductor system made up of a plurality of interconnected modular assemblies secured together in longitudinal alignment to provide a conductor system of any desired length for supplying electric power at any point along the length of the system, (a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turn inwardly toward one another at their bottom edges to form a pair of longitudinally extending bottom walls which define therebetween a central longitudinally extending slot of substantially constant width, said side walls being internally provided with a pair of opposed inwardly projecting ledges spaced below said top wall and respectively extending longitudinally along the full lengths of said side walls, (b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said rail sections being respectively adapted for engagement by current collecting shoes of a power tap-off device movable along said system for supplying current therefrom to a work utility, said support blocks having longitudinally extending opposite side flanges adapted to seat upon said enclosure side wall ledges at any pre-elected point along the length thereof when said support blocks are slid endwise into said enclosure, adjacent ones of said conductor rail sections being longitudinally aligned and end-spaced from one another to provide an air gap therebetween and being fixedly secured to a conductor support block structure to thereby prevent longitudinal shifting therebetween, the length of the air gap being less than the longitudinal extent of the current collector shoe of the power take-off device utilized with the conductor system, and (c) means fixedly securing said conductor rails support blocks to said enclosures at predetermined spaced intervals along the length of the latter.

9. In an enclosed conductor system made up of a plurality of interconnected modular assemblies secured together in longitudinal alignment to provide a conductor system of any desired length for supplying electric power at any point along the length of the system, (a) a plurality of enclosure sections of hollow generally rectangular cross-section formed of electrical insulation material each having a substantially horizontal top wall from which substantially vertically depend at opposite longitudinally extending sides thereof a pair of longitudinally extending side walls which turn inwardly toward one another at their bottom edges to form a pair of longitudinally extending bottom walls which define therebetween a central longitudinally extending slot of substantially constant width, said side walls being internally provided with a pair of opposed inwardly projecting ledges spaced below said top wall and respectively extending longitudinally along the full lengths of said side walls, (b) a plurality of longitudinally spaced relatively flat conductor support blocks formed of electrical insulating material provided with a plurality of laterally spaced longitudinally extending conductor rail receiving channels through which electrical conductor rail sections are slidably projected and supportably held by the support blocks, said rail sections being respectively adapted for engagement by current collecting shoes of a power tap-off device movable along said system for supplying current therefrom to a work utility, said support blocks having longitudinally extending opposite side flanges adapted to seat upon said enclosure side wall ledges at any pre-elected point along the length thereof when said support blocks are slid endwise into said enclosure, adjacent ones of said conductor rail sections being longitudinally alined and end-spaced from one another to provide an air gap therebetween, said air gap being of sufficient length to prevent bridging thereof by the current collector shoes of any power tap-off device utilized with said conductor system to thereby prevent bridging of said air gap and prevent energization of one conductor rail section from another conductor rail section through the power tap-off device, said conductor rail sections being fixedly secured at some point along their length to one of said conductor support blocks so that the integrity of the air gap is preserved, the proximate facing ends of said conductor rails being smoothly upturned to provide a camming surface for the current collector shoes of the power tap-off device utilized with the conductor system to enable the current collector shoes to be cammed downward into proper contact relation with conductor rail and avoid destructive impact forces, and (c) means fixedly securing said conductor rails support blocks to said enclosures at predetermined spaced intervals along the length of the latter.

References Cited

UNITED STATES PATENTS

| 2,036,265 | 4/1936 | Frank et al. | 191—23 |
| 2,090,725 | 8/1937 | Frank et al. | 191—23 |
| 2,128,135 | 8/1938 | Glasgow | 191—23 |
| 2,278,761 | 4/1942 | Benbow | 191—35 |
| 2,495,526 | 1/1950 | King | 191—23 |
| 2,675,434 | 4/1954 | Hermann | 191—23 |
| 2,681,392 | 6/1954 | Hermann | 191—23 |
| 2,696,533 | 12/1954 | Hammerly et al. | 191—23 |
| 2,725,973 | 12/1955 | King | 198—177 |
| 2,882,356 | 4/1959 | Davis et al. | 191—23 |
| 2,958,743 | 11/1960 | Moore | 191—23 |
| 3,028,455 | 4/1962 | Devonshire | 191—23 |

FOREIGN PATENTS 226,150  6/1943  Switzerland.

ARTHUR L. LA POINT, *Primary Examiner.*

S. B. GREEN, S. T. KRAWCZEWICZ,
*Assistant Examiners.*